(12) United States Patent
Horng

(10) Patent No.: US 6,912,379 B2
(45) Date of Patent: Jun. 28, 2005

(54) INFRARED RAY TRANSMITTING AND RECEIVING DEVICE HAVING A SIGNAL COMMUNICATOR

(75) Inventor: Neng-Chyi Horng, Kaohsiung (TW)

(73) Assignee: Taiwan Security Net Co., Ltd., Fengshan (TW)

(*) Notice: Subject to any disclaimer, the term of this patent is extended or adjusted under 35 U.S.C. 154(b) by 439 days.

(21) Appl. No.: 10/102,991

(22) Filed: Mar. 21, 2002

(65) Prior Publication Data

US 2003/0181166 A1 Sep. 25, 2003

(51) Int. Cl.[7] .............................................. H04B 17/00
(52) U.S. Cl. .................. 455/226.4; 455/41.2; 345/158; 398/119
(58) Field of Search .............................. 455/41.1, 41.2, 455/41.3, 25, 226.1, 226.2, 226.3, 226.4; 345/158, 157; 398/9, 119; 250/250, 336.1; 356/51

(56) References Cited

U.S. PATENT DOCUMENTS

| | | | | |
|---|---|---|---|---|
| 5,268,734 A | * | 12/1993 | Parker et al. | 356/139.06 |
| 5,892,501 A | * | 4/1999 | Kim et al. | 345/158 |
| 6,678,535 B1 | * | 1/2004 | Narayanaswami | 455/557 |
| 6,710,721 B1 | * | 3/2004 | Holowick | 340/870.02 |

* cited by examiner

Primary Examiner—Vivian Chin
Assistant Examiner—Lewis West
(74) Attorney, Agent, or Firm—Thomas, Kayden, Horstemeyer & Risley, LLP

(57) ABSTRACT

An IR transmitting and receiving device with a signal communicator has an RF transmitter unit connected to an IR receiver and an RF receiver communicating with the RF transmitter unit. The RF receiver is able to get the status of the signal at the IR receiver through the RF transmitter unit and then show the status on a display device. Therefore when a user sets the IR transmitting and receiving device, the user easily adjusts one position of the IR transmitter and the IR receiver, until the IR receiver received the max light strength from the IR transmitter.

1 Claim, 2 Drawing Sheets

INFRARED RAY TRANSMITTING AND RECEIVING DEVICE HAVING A SIGNAL COMMUNICATOR

BACKGROUND OF THE INVENTION

1. Field of the Invention

The present invention relates to an IR transmitting and receiving device having a signal communicator, and more particularly to a signal communicator used to precisely adjust the alignment between an IR transmitter and an IR receiver of the IR transmitting and receiving device.

2. Description of Related Art

An infrared ray (IR) device has a transmitter and a receiver to receive the infrared ray from the transmitter. In general, to increase the IR strength of the infrared ray of the IR transmitting and receiving device, a convex is formed on a light output of the transmitter to converge the infrared ray. Therefore the effective transmitting distance of the infrared ray of the IR transmitting and receiving device can be increased, and the nominal effective transmitting distance of IR transmitting and receiving devices is in the range of 20~250 meters. However, the beam of the infrared ray is converged at a fixed range by the convex, so the position where a light input of the receiver is placed must be precisely positioned and aligned with the light output of the IR transmitter. That is, when the two positions of the IR transmitter and the IR receiver are not at the correct and angles, the IR from the IR transmitter is not received by the IR receiver completely.

As indicated by the foregoing description, measuring the relative position between the IR transmitter and the IR receiver is important. The technique of adjusting IR transmitting and receiving devices includes a horizontal adjustment, a vertical adjustment and an exact placement with regard to distance. When the transmitter and the receiver are set at two different places, the people adjusting the units have to connect electronic instruments to the electronic signal output of the receiver, and measure the strength of signal at the IR receiver based on variations in vertical and horizontal angle and distance. Depending on the strength of the detected signal and whether or not the signal at the IR receiver is the standard strength, two people have to adjust the positions of the IR transmitter and the IR receiver. Furthermore, if the two people need to set up an IR transmitting and receiving device at a great transmitting distance, the two people have to communicate with each other to adjust the angle or direction of the IR transmitter or the IR receiver using radio communicators until the IR receiver receives the max light strength. Therefore the present IR transmitting and receiving device still has many drawbacks including:

1. At least two people are required to set up the long distance IR transmitting and receiving device. Because the positions of the transmitter and the receiver need to be adjusted and the distance between them is long, at least two people are required to set up the IR transmitting and receiving device.

2. Aligning the relative position between the transmitter and the receiver is difficult. When the transmitter and the receiver are set up at two different places, electronic devices must be connected to the receiver or the transmitter to know the receiving or transmitting status, and radio communicators are needed so the two people at different places can communicate.

3. Long installation time. When the IR transmitting and receiving device are to be set up, the relative position between the transmitter and the receiver must be adjusted, so that the installing the IR transmitting and receiving device requires too much time.

4. Quality of the alignment between the IR transmitting and receiving device is not the best. Because the adjusting process is manual, the quality of the alignment during the installation of the IR transmitting and receiving device is not the best every time.

Therefore, an objective of the invention is to provide a signal communicator to mitigate or/and obviate the aforementioned problems.

SUMMARY OF THE INVENTION

The main objective of the present invention is to provide a signal communicator which is able to help a user to easily align the IR transmitter and the IR receiver, whereby the light transmitting quality of the IR transmitter and receiver is best.

Other objects, advantages and novel features of the invention will become more apparent from the following detailed description when taken in conjunction with the accompanying drawings.

DETAILED DESCRIPTION OF THE PREFERRED EMBODIMENT

Figure 1:
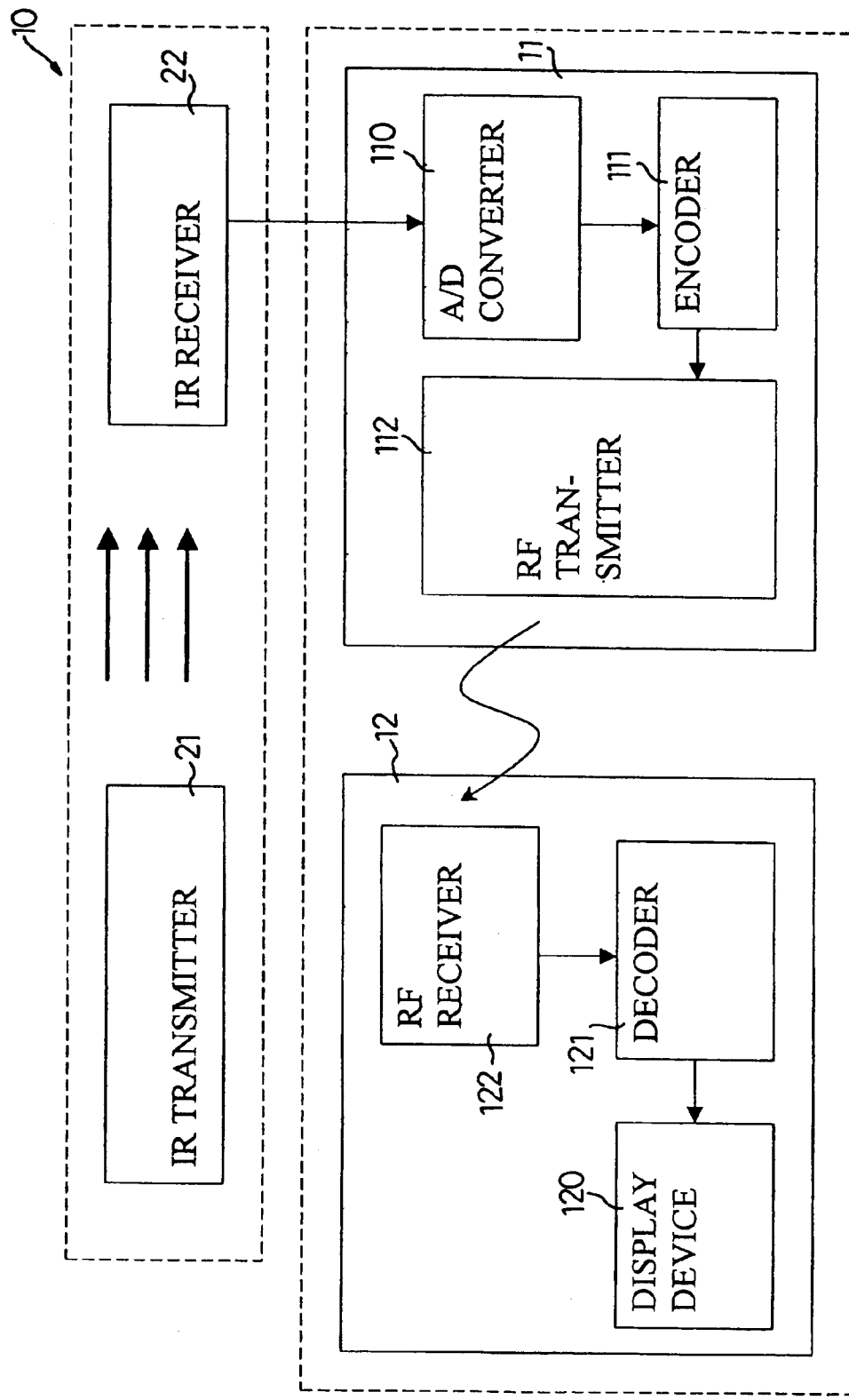
FIG. 1 is a block diagram of a first embodiment of an IR transmitting and receiving device having a signal communicator in accordance with the present invention.

With reference to FIG. 1, an IR transmitting and receiving device having a signal communicator (10) in accordance with the present invention comprises an IR transmitter (21), an IR receiver (22), a RF transmitter unit (11) and an RF receiver unit (12). The RF transmitter unit (11) connects to the IR receiver (22) and communicates with the RF receiver unit (11) by radio technology.

The RF transmitter unit (11) comprises an analog to digital (A/D) converter (110) connected to an electronic signal output of the IR receiver (22), an encoder (111) connected to an output of the AID converter (110), and a RF transmitter (112) connected to an output of the encoder (111). The IR receiver (22) receives an infrared ray signal from the IR transmitter (21) and outputs an electronic signal. Because the input signal and output signal of the encoder (111) are electronic digital signals, the electronic signal is converted to a digital signal by the A/D converter (110), and then the digital signal is output to the encoder (111). When the encoder (111) receives the digital signal, the digital signal is encoded by the encoder (111), and is output to the RF transmitter (112) where it is converted to a radio signal and out over the air.

The RF receiver unit (12) comprises a RF receiver (122), a decoder (121) connected to an output of the RF receiver (122) and a display device (120) connected to an output of the decoder (121). When the radio signal from the RF transmitter unit (11) is received by the RF receiver (122), the RF receiver (122) outputs an encoded signal to the decoder (121) to decode the encoded signal to the digital signal. The decoder (121) outputs the digital signal to the display device (120) to show the digital signal of the IR receiver (22) from the RF transmitter unit (11).

Figure 2:
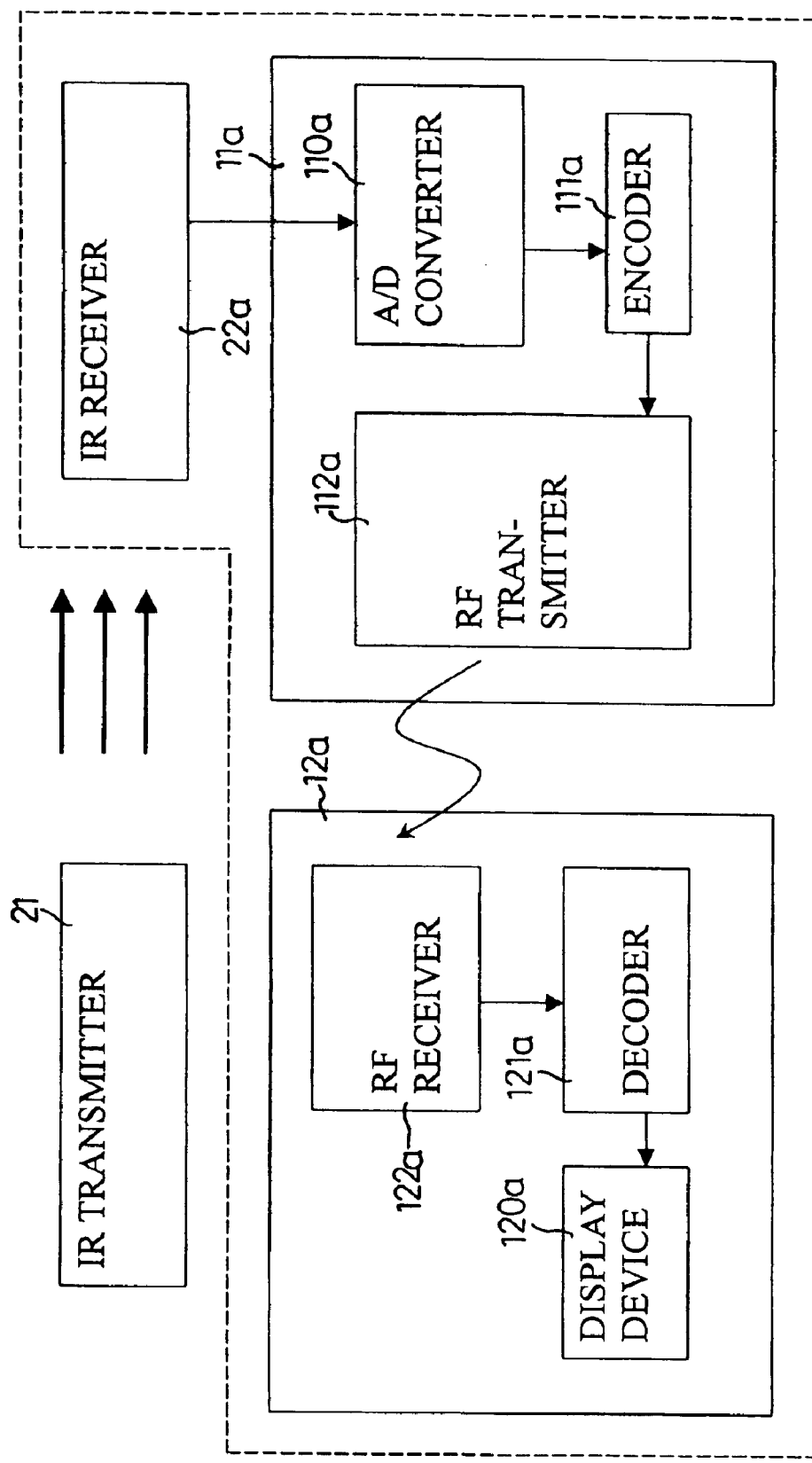
FIG. 2 is a block diagram of a second embodiment of an IR transmitting and receiving device having a signal communicator in accordance with the present invention.

With reference to FIG. 2, a second embodiment of the present invention is shown. There is one difference between the first embodiment and the second embodiment. The IR receiver (22a) and the RF transmitter unit (11a) are able to be fabricated in one electronic circuit board (not shown).

When the IR transmitter (21) and the IR receiver (22) are set up in two different places, the IR receiver (22) will receive the infrared signal from the RF transmitter and then output the corresponding electronic signal to the RF transmitter unit (11) of the signal communicator (10). Therefore, people adjust the IR transmitter (21) to align with the IR receiver (22), and then the IR receiver (22) will output the corresponding electronic signal. The IR receiver (22) will output the largest strength of the corresponding electronic signal if the IR receiver (22) and the IR transmitter (23) are aligned accurately. The RF transmitter unit (11) will process and output the electronic signal to the RF receiver unit (12) to the RF receiver unit (12). Thus, the people are able to see the signal strength changes on the display (120) of the receiver unit (12) to decide whether the IR receiver (22) is aligned with the IR transmitter (21) or not. That is, only one operator has to adjust the angle of the light output of the IR transmitter (21) until the max strength of the signal from the IR receiver (22) is shown on the display device (120) and the aligning procedure of the IR receiver and IR transmitter is completed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An IR transmitting and receiving device having a signal communicator, comprising:
    an IR transmitter to output IR light;
    an IR receiver used to receive the IR light from the IR transmitter and output electronic signals according to the IR light, wherein the IR receiver has an output;
    an RF transmitter unit connected to the output of the IR receiver and comprising:
        an analog to digital converter connected to the output of the IR receiver to convert the electronic signals from the output of the IR receiver to different digital signals;
        an encoder connected to the analog to digital converter to encode the digital signals from the analog to digital converter to the encoded signals; and
        an RF transmitter connected to the encoder to turn the encoded signals to radio signals; and
    an RF receiver unit communicating with the RF transmitter unit comprising:
        an RF receiver to receive the radio signals from the RF transmitter, wherein the RF receiver turns the radio signals into the encoded signals liked the encoded signals output from the encoder of the RF transmitter unit;
        a decoder connected to the RF receiver to decode the encoded signals from the RF receiver to the different digital signals, each of which is presented to a strength of the corresponding electronic signal; and
        a display device connected to the decoder to show the different digital signals;
    whereby since a strength of the electronic signal output from the IR receiver is changed according to a strength of the IR light received by the IR receiver, the display shows different values according to the different digital signals corresponding to the electronic signals to an operator, wherein the operator adjusts angle of the IR light of the IR transmitter according to the values shown on the display to make the IR receiver receive a largest strength of the IR light.

* * * * *